(12) United States Patent
Fukushi et al.

(10) Patent No.: US 8,227,378 B2
(45) Date of Patent: Jul. 24, 2012

(54) ARSENIC SORBENT FOR REMEDIATING ARSENIC-CONTAMINATED MATERIAL

(75) Inventors: Keisuke Fukushi, Ishikawa (JP); Minoru Sakai, Saitama (JP); Takashi Munemoto, Tokyo (JP)

(73) Assignee: National University Corporation Kanazawa University, Kanazawa-Shi (JP)

( * ) Notice: Subject to any disclaimer, the term of this patent is extended or adjusted under 35 U.S.C. 154(b) by 0 days.

(21) Appl. No.: 13/192,909

(22) Filed: Jul. 28, 2011

(65) Prior Publication Data

US 2012/0012532 A1    Jan. 19, 2012

Related U.S. Application Data

(63) Continuation of application No. PCT/JP2010/050880, filed on Jan. 25, 2010.

(30) Foreign Application Priority Data

Jan. 28, 2009  (JP) ................................. 2009-017367

(51) Int. Cl.
C01B 31/08    (2006.01)
(52) U.S. Cl. ...................................... 502/427; 502/515
(58) Field of Classification Search .................. 502/400, 502/417, 427, 515, 516
See application file for complete search history.

(56) References Cited

FOREIGN PATENT DOCUMENTS

JP    01-127094 A1    5/1989

OTHER PUBLICATIONS

Yuka Yokoyama et al., "*Calcite eno Arsenious Acid to arsenic Acid no Bunpai Kyodo no Hikaku,*" Dai 17 Kai Symposium on Environmental Chemistry Program and Abstracts, 2008, pp. 868 to 869.

Mark C. Ciardelli, et al., "*Role of Fe(II), Phosphase, Silicate, Sulfate, and Carbonate in Arsenic Uptake by Coprecipitation in Synthetic and Natural Groundwater,*" Water Research, 2008, 42(3), pp. 615-624.

Alexandratos, Vasso G., et al., "*Arsenate Uptake by Calcite: Macroscopic and Spectroscopic Characterization of Adsorption and Incorporation Mechanisms,*" Geochimica et Cosmochimica Acta 71 (2007) 4172-4187.

Fukushi, K., et al., "*Records of Water Quality in Lake Hovsgol Printed in Carbonate Minerals in the Sediments,*" Abstract vol. 6th International Symposium on Terrestrial Environmental Changes in East Eurasia and Adjacent Areas, (2007) 24-25.

Munemoto, T., et al., "*Transformation Kinetics of Monohydrocalcite to Aragonite in Aqueous Solutions,*" Journal of Mineralogical and Petrological Sciences, 103 (2008) 345-349.

Kinsman, David J.J., et al., "*The Co-precipitation of Cations with $CaCO_3$-IV. The Co-precipitation of $Sr^{2+}$ with Aragonite between 16° and 96°C.,*" Geochimica et Cosmochimica Acta 33 (1969) 1-17.

Munemoto, T., et al., "*Stability of Monohydrocalcite: Effect of Phosphate to Transformation Kinetics of Monohydrocalcite,*" Abstracts of $52^{nd}$ Annual Meeting of the Clay Science Society of Japan, (2009) 190-191.

*Primary Examiner* — Edward Johnson
(74) *Attorney, Agent, or Firm* — Burr & Brown

(57) ABSTRACT

An arsenic sorbent includes monohydrocalcite that has been precipitated by mixing an aqueous solution of a soluble carbonate or a carbonate with an aqueous solution that includes an $Mg^{2+}$ ion and a $Ca^{2+}$ ion in a ratio "Mg/Ca" of 0.3 or more, the monohydrocalcite having a molar ratio "Mg/(Ca+Mg)" of 0.1 or less. The arsenic sorbent exhibits a high arsenic sorption ability, and can stably retain a sorbate. A purification method using the same is also disclosed.

4 Claims, 6 Drawing Sheets

△ MONOHYDROCALCITE THAT WAS WASHED THREE TIMES
⊚ MONOHYDROCALCITE THAT WAS WASHED FIVE TIMES
▼ MONOHYDROCALCITE THAT WAS WASHED BY DIALYSIS
● ADSORPTION OF ARSENIC BY CALCITE (Vasso et al. (2007))

FIG. 3
SYNTHESIS OF MHC
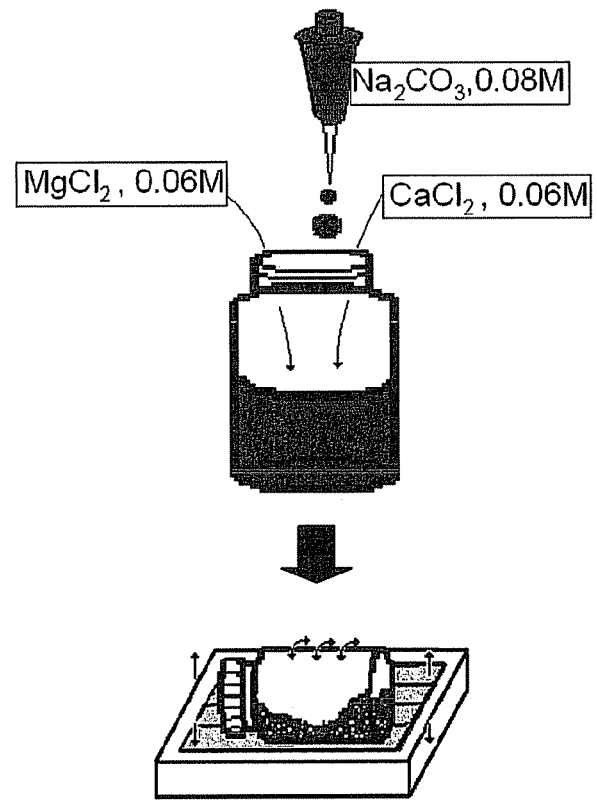
STIRS MIXTURE AT 25°C FOR 48 HOURS
FILTERS MIXTURE THROUGH FILTER (PORE SIZE: 0.2 MICROMETERS)
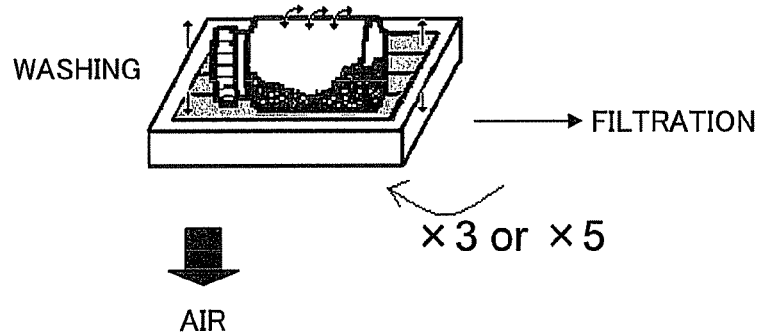

ARSENIC SORBENT FOR REMEDIATING ARSENIC-CONTAMINATED MATERIAL

CROSS REFERENCE TO RELATED APPLICATION

This application is a continuation of International Patent Application No. PCT/JP2010/050880, having an international filing date of Jan. 25, 2010, which designated the United States, the entirety of which is incorporated herein by reference. Japanese Patent Application No. 2009-017367 filed on Jan. 28, 2009 is also incorporated herein by reference in its entirety.

BACKGROUND

The present invention relates to an arsenic sorbent that takes up arsenic from an arsenic-contaminated environmental substance or the like, and may be used as a purification material, and a method of purifying an arsenic-contaminated substance.

Arsenic (As) is an environmental pollutant that damages health when taken into a human body even in a small amount.

Therefore, technology that effectively removes arsenic from arsenic-contaminated water, soil, or the like has been desired.

Examples of a water-soluble arsenic compound include arsenious acid, arsenate, and an organic arsenate.

Arsenic is present as arsenious acid in ground water under a reducing environment, and reacts with oxygen on the ground to form arsenate.

Since arsenious acid and arsenate are highly toxic, it is important to remove those.

Technology that causes a natural trace element such as arsenic to be adsorbed on the surface of a mineral has been known. For example, Vasso G. Alexandratos, Evert J. Elzinga, Richard J. Reeder, "Arsenate uptake by calcite: Macroscopic and spectroscopic characterization of adsorption and incorporation mechanisms", Geochimica et Cosmochimica Acta 71 (2007) 4172-4187 ("Document 1") describes that calcite ($CaCO_3$) adsorbs arsenate.

However, the arsenate adsorption ability of calcite is insufficient for purifying an arsenic-contaminated substance. Moreover, calcite has poor arsenate adsorption stability.

SUMMARY

According to one aspect of the invention, there is provided an arsenic sorbent comprising monohydrocalcite that has been precipitated by mixing a soluble carbonate or an aqueous solution of a carbonate with an aqueous solution that includes an $Mg^{2+}$ ion and a $Ca^{2+}$ ion in a ratio "Mg/Ca" of 0.3 or more, the monohydrocalcite having a molar ratio "Mg/(Ca+Mg)" of 0.1 or less.

According to another aspect of the invention, there is provided a method of purifying an arsenic-contaminated substance comprising adding the above arsenic sorbent to a contaminated water having an arsenic concentration of 10 ppm or less.

Figure 1:
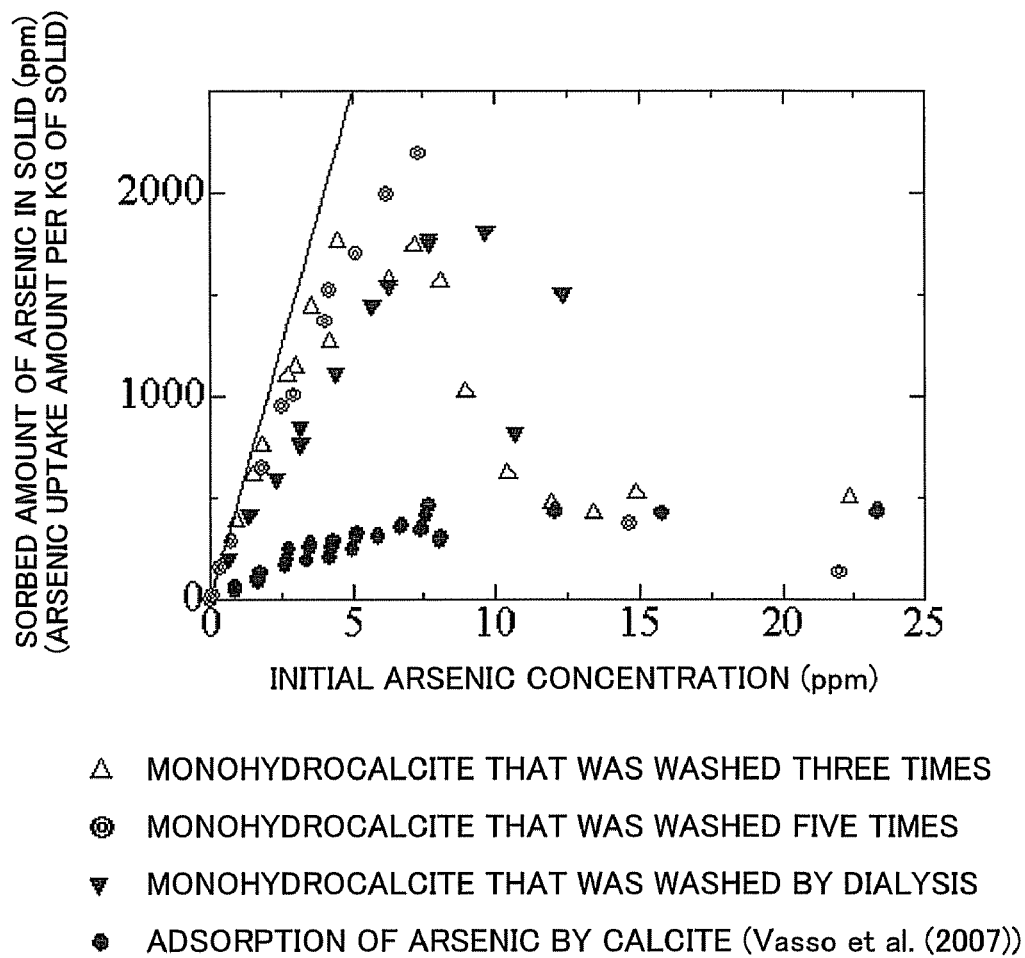
FIG. 1 shows the sorption amount measurement results for monohydrocalcite (MHC) and calcite (based on the adsorption isotherm disclosed in "Document 1") versus the initial arsenic (As) concentration (ppm) of the solution.

A straight line in FIG. 1 indicates conditions whereby arsenic present in the solution is completely taken up by a solid.

In FIG. 1, a triangle indicates the case of using monohydrocalcite that was washed three times, and a double circle indicates the case of using monohydrocalcite that was washed five times.

A black downward triangle indicates the case of using monohydrocalcite that was washed by dialysis.

Figure 2:
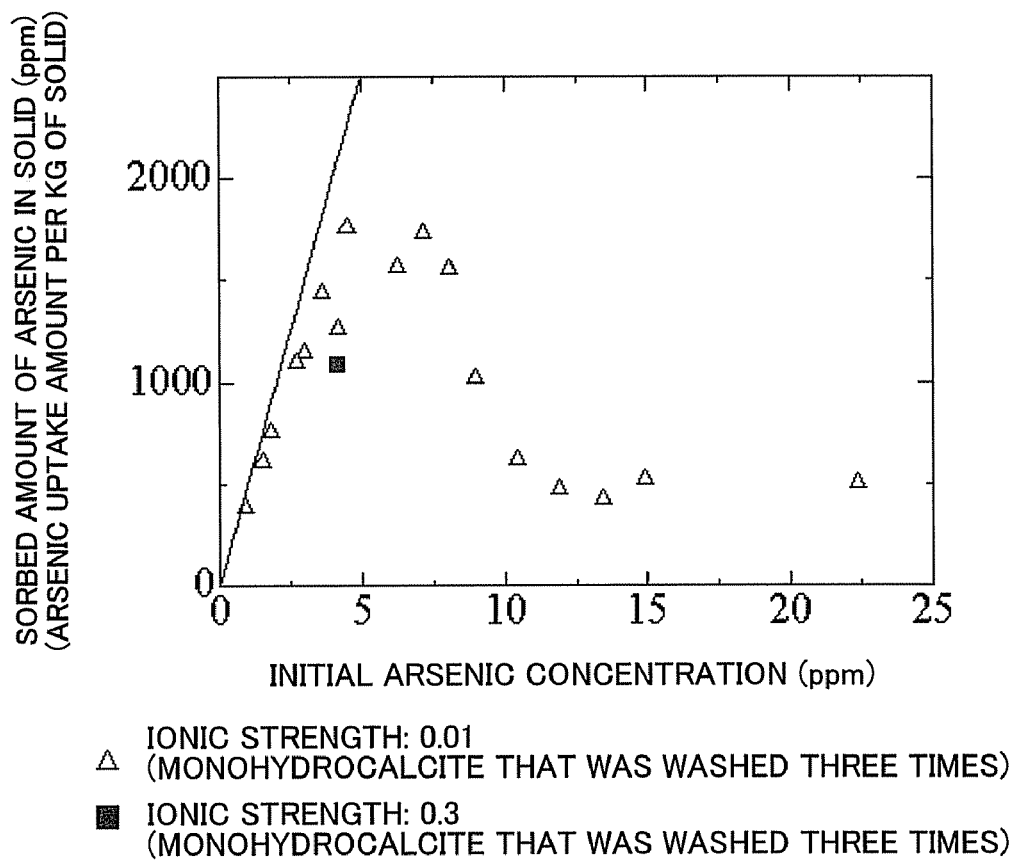

FIG. 2 is a graph showing the arsenic sorption ability when the ionic strength in the arsenic solution is 0.01 mol/l or 0.3 mol/l.

FIG. 3 shows an example of synthesis of monohydrocalcite (MHC).

Figure 4:
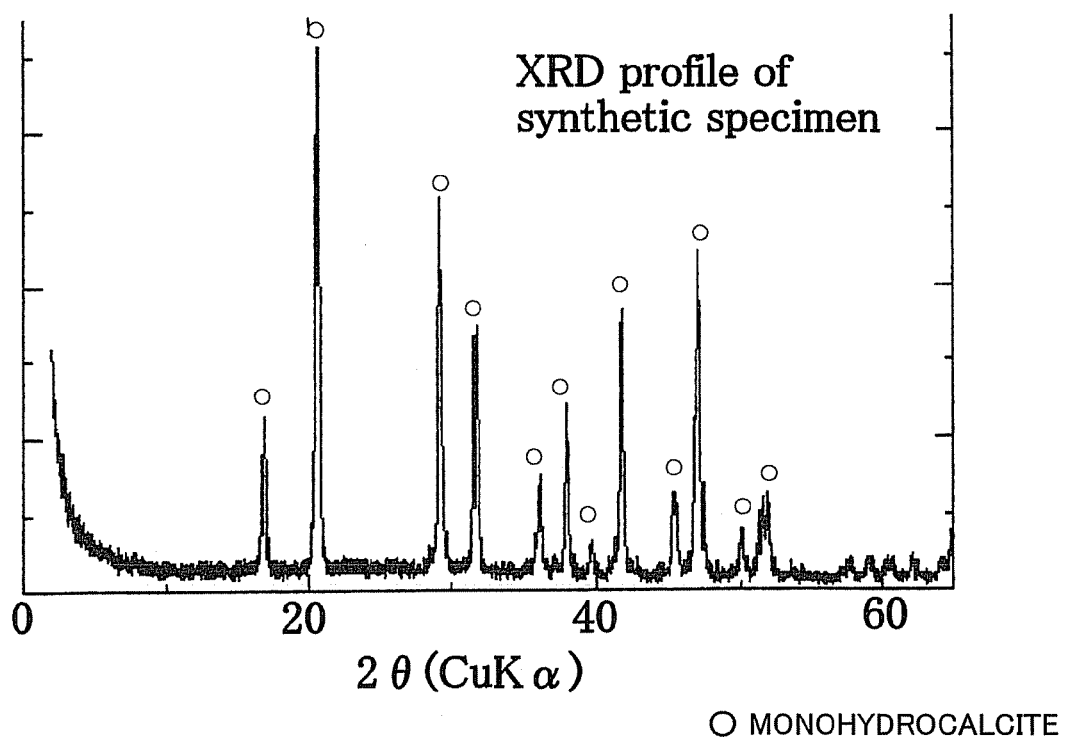

FIG. 4 shows an XRD chart of the synthesized monohydrocalcite.

Figure 5:
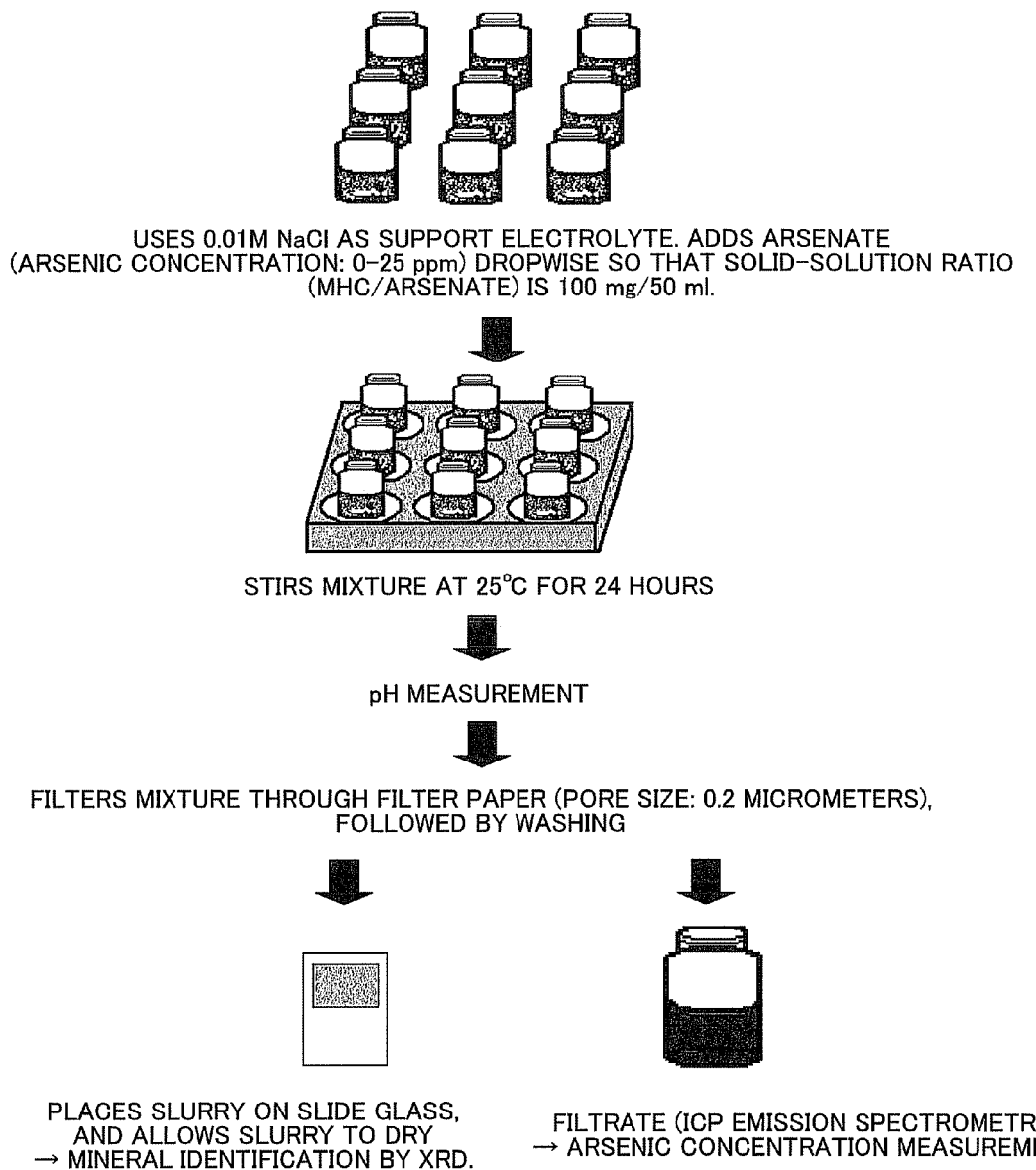

FIG. 5 shows an arsenic sorption experiment procedure using monohydrocalcite.

Figure 6:
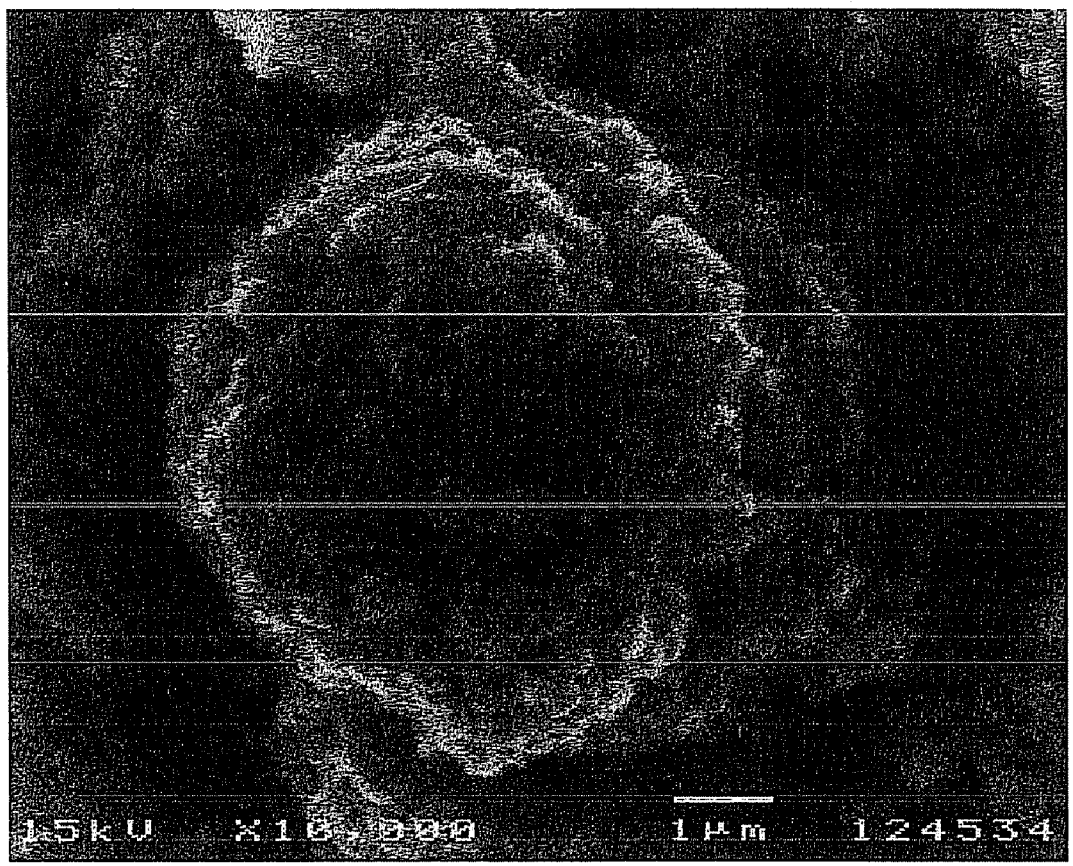

FIG. 6 shows an electron micrograph of synthesized monohydrocalcite.

DESCRIPTION OF EXEMPLARY EMBODIMENTS

The invention may provide an arsenic sorbent that exhibits a high arsenic sorption ability and excellent sorbate stability, and a purification method using the same.

A calcium carbonate may be present as calcite ($CaCO_3$) or aragonite ($CaCO_3$).

Calcite and aragonite has different crystal structure, thus they are classified as different type of minerals.

It is known that a calcium carbonate hydrate may be present as monohydrocalcite ($CaCO_3.H_2O$), ikaite ($CaCO_3.6H_2O$), or amorphous calcite.

The inventors of the invention found that monohydrocalcite is present in the 200,000-year-old sediment core at Lake Hovsgol (semi-closed lake) in Mongolia (Hovsgol Drilling Project in 2004) (Fukushi K., Fukumoto H., Munemoto T., Ochiai S., and Kashiwaya K., "Records of water quality in Lake Hovsgol printed in carbonate minerals in the sediments", Abstract volume 6th international symposium on terrestrial environmental changes in East Eurasia and Adjacent Areas, (2007) 24-25). The inventors synthesized monohydrocalcite in a laboratory, and conducted studies on the transformation behavior of monohydrocalcite (Munemoto T. and Fukushi K., "Transformation kinetics of monohydrocalcite to aragonite in aqueous solutions", Journal of Mineralogical and Petrological Sciences, 103, (2008) 345-349).

It is also known that monohydrocalcite is obtained by adding sodium carbonate to sea water.

Kinsmann et al. reported that single-phase monohydrocalcite precipitates from sea water by adding sodium carbonate to sea water (sampled in New Jersey) that was filtered at a low temperature (16° C.) to a concentration of 8 mM (Kinsman J. J. David and Holland H. D., "The co-precipitation of cations with $CaCO_3$. The co-precipitation of $Sr^{2+}$ with aragonite between 16° C. and 96° C.", Geochimica et Cosmochimica Acta 33 (1969) 1-17).

Monohydrocalcite ($CaCO_3.H_2O$) has a trigonal crystal structure (a=10.5547 Å, c=7.5644 Å). Monohydrocalcite precipitates under supersaturated $CO_2$ at a ratio "Mg/Ca" of 0.3 or more. Monohydrocalcite is stable in a dry state, but is dissolved in water, and recrystallizes to aragonite or calcite.

Specifically, monohydrocalcite is a metastable phase as compared with aragonite or calcite (stable phase), and is expected to exhibit high reactivity. The inventors thus found that the reactivity of monohydrocalcite can be used for arsenic uptake. This finding has led to the completion of the invention.

An arsenic sorbent according to one embodiment of the invention includes monohydrocalcite (MHC) as the main component.

More specifically, the arsenic sorbent includes monohydrocalcite that has been precipitated by mixing a soluble carbonate or an aqueous solution of a carbonate with an aqueous solution that includes an $Mg^{2+}$ ion and a $Ca^{2+}$ ion in a ratio "Mg/Ca" of 0.3 or more, the monohydrocalcite having a molar ratio "Mg/(Ca+Mg)" of 0.1 or less.

The monohydrocalcite in powder form having an average primary particle size of 900 nm or less and an average secondary particle size of 30 μm or less is preferable, because it may exhibit higher solubility to water and superior sorption ability when recrystallized to aragonite or calcite.

Since the monohydrocalcite takes up arsenate at phase change to aragonite or calcite after dissolution, it is effective for purifying a low-concentration arsenic-contaminated substance.

Therefore, the arsenic sorbent of the present invention is effective for stabilization of arsenate ions dissolved in water in low arsenic concentration such as 10 ppm or less, particularly 100 ppb or less which may be experienced in the case of arsenic-contaminated ground water.

In the present specification, the arsenic sorption is not limited to sorption from water contaminated with arsenious acid or arsenate, but also takes up (purifies) arsenic in soil as arsenate or the like.

Also, the word "sorbent" in the present specification may not merely mean material which adsorbs arsenic on its surface, but takes up arsenic into it (inside crystal) to effect stabilization.

When washing the monohydrocalcite so that the molar ratio "Mg/(Ca+Mg)" in the monohydrocalcite becomes more than 0.01 and about 0.1 or less, the arsenic sorbent is dissolved in water, and mainly produces aragonite via phase change while taking up arsenic ions. When washing the monohydrocalcite so that the molar ratio "Mg/(Ca+Mg)" in the monohydrocalcite becomes 0.01 or less, the arsenic sorbent mainly produces calcite via phase change while taking up arsenic ions.

Since the arsenic sorbent according to one embodiment of the invention contains monohydrocalcite as the main component, and the monohydrocalcite (metastable phase) is dissolved in water and takes up arsenic while recrystallization to aragonite or calcite, it exhibits an excellent arsenic sorption ability and stability as compared with calcite disclosed in "Document 1".

A synthesis example of monohydrocalcite (MHC) is described below with reference to FIG. 3.

A 0.06 mol/l $CaCl_2$ aqueous solution, a 0.06 mol/l $MgCl_2.6H_2O$ aqueous solution, and a 0.08 mol/l $Na_2CO_3$ aqueous solution were mixed, and the mixture was stirred at 25° C. for 48 hours.

The solid-liquid mixture was filtered through a filter paper having a pore size of 0.2 μm, and the solid phase was washed with purified water, and filtered. This operation was then repeated twice or four times.

Another sample was washed by dialysis after filtration.

The solid phase was then allowed to dry, and subjected to X-ray powder diffraction analysis (XRD). FIG. 4 shows the XRD chart.

The peak values shown in FIG. 4 coincide with those of monohydrocalcite.

FIG. 6 shows an electron micrograph of the monohydrocalcite thus synthesized.

As shown in FIG. 6, primary particles having a diameter of several hundred nanometers (900 nm or less) aggregate to form secondary particles having a diameter of 5 to 10 μm.

The ratio of Ca to Mg in the monohydrocalcite washed three times, five times, and washed by dialysis was analyzed respectively.

The monohydrocalcite that was washed three times had a molar ratio "Ca:Mg" of 98:2, and the monohydrocalcite that was washed five times had a molar ratio "Ca:Mg" of 99:1.

The monohydrocalcite that was washed by dialysis had a molar ratio "Ca:Mg" of 91:9

An arsenic uptake experiment was performed as shown in FIG. 5 using the monohydrocalcite synthesized as described above.

mol/l NaCl (ionic strength: 0.01) was used as a support electrolyte. Arsenate having an arsenic concentration of 0 to 25 ppm was added dropwise to the support electrolyte so that the solid-solution ratio (monohydrocalcite/arsenate) was 100 mg/50 ml. The mixture was then stirred at 25° C. for 24 hours.

When using the monohydrocalcite that was washed by dialysis, the mixture was stirred at 25° C. for 48 hours.

The mixture was then filtered through a filter paper having a pore size of 0.2 μm, and the solid phase was washed, applied to a slide, and allowed to dry. An XRD analysis was then performed.

The arsenic concentration of the filtrate was determined by ICP emission spectrometry, and the arsenic uptake amount was calculated from the difference in arsenic concentration.

A comparative experiment was performed using 0.3 mol/l NaCl (ionic strength: 0.3) as the support electrolyte.

The results are shown in FIGS. 1 and 2.

In FIGS. 1 and 2, a triangle indicates the case of using the monohydrocalcite that was washed three times, and a double circle indicates the case of using the monohydrocalcite that was washed five times.

A black downward triangle indicates the case of using the monohydrocalcite that was washed by dialysis.

In FIG. 2, a black square indicates the case of using 0.3 mol/l NaCl (ionic strength: 0.3) (support electrolyte) and the monohydrocalcite that was washed three times.

As a comparison, a black circle indicates the arsenic adsorption data when using calcite disclosed in "Document 1".

As shown in FIGS. 1 and 2, most of the arsenic added to the solution was taken up when the initial arsenic concentration was low (about 5 ppm or less).

The maximum uptake amount (sorption amount) was about 1700 ppm when using the monohydrocalcite that was washed three times and the monohydrocalcite that was washed by dialysis, and was about 2200 ppm when using the monohydrocalcite that was washed five times.

The uptake amount decreased along with an increase in arsenic concentration.

A sorption ability better than that of calcite was obtained when the arsenic concentration was 10 ppm or less.

The maximum uptake amount obtained when using the monohydrocalcite that was washed five times was larger than that obtained when using the monohydrocalcite other than the monohydrocalcite that was washed five times.

When using the monohydrocalcite that was washed three times or the monohydrocalcite that was washed by dialysis, the monohydrocalcite changed into aragonite when the arsenic concentration was low, and a peak that indicates aragonite and monohydrocalcite appeared as the arsenic concentration increased. When using the monohydrocalcite that was washed five times, the monohydrocalcite mainly changed into calcite when the arsenic concentration was low.

It was thus confirmed that monohydrocalcite mainly changes into calcite via dissolution and recrystallization when the molar ratio "Mg/(Ca+Mg)" in the monohydrocalcite is 0.01 or less (when washed five times), and mainly changes into aragonite via dissolution and recrystallization when the molar ratio "Mg/(Ca+Mg)" in the monohydrocalcite is more than 0.01 and about 0.1 or less.

It was also confirmed that arsenic sorption takes time when the Mg content is high.

Table 1 shows the initial arsenic concentration (100 ppb or less) of the solution and the arsenic concentration of the solution after a reaction has occurred.

As shown in Table 1, the arsenic concentration after the reaction (i.e., uptake by monohydrocalcite) decreased to about 10 ppb (environmental standard).

As shown in FIG. 2, it was confirmed that arsenate was taken up from the aqueous solution having an ionic strength of 0.3.

TABLE 1

| Sample | Initial arsenic concentration of solution | Arsenic concentration of solution after reaction |
| --- | --- | --- |
| Washed three times | 65.9 ppb | 11.1 ppb |
| Washed three times | 54.9 ppb | 9.1 ppb |
| Washed five times | 48.9 ppb | 11.1 ppb |
| Washed three times | 43.9 ppb | 8.1 ppb |
| Washed three times | 32.9 ppb | 7.5 ppb |

As described above, monohydrocalcite is obtained by adding a carbonate or an aqueous solution thereof to an aqueous solution in which $Mg^{2+}$ ions and $Ca^{2+}$ ions are mixed so that the ratio "Mg/Ca" is 0.3 or more, and it is preferable to wash the resulting monohydrocalcite so that the molar ratio "Mg/(Ca+Mg)" is 0.1 or less (0.01 or less when producing a calcite phase).

Monohydrocalcite can be synthesized by stirring a raw material mixture at room temperature (25° C.) for about 24 to about 72 hours, and a batch washing operation may then be performed when implementing mass production. An arbitrary method may be used insofar as the Mg content can be controlled.

It is preferable to adjust the P ion concentration to 1 ppm or less during synthesis and arsenic sorption.

A P ion inhibits production of aragonite and calcite, and delays a transformation of monohydrocalcite (Munemoto T., Sakai M., Fukumoto H., and Fukushi K., (2009) Stability of Monohydrocalcite: Effect of Phosphate to Transformation Kinetics of Monohydrocalcite, Abstracts of 52nd annual meeting of the Clay Science Society of Japan, pp. 190-191).

Monohydrocalcite (MHC) according to the invention takes up arsenic from an arsenic-contaminated environmental substance as arsenate or the like, and may be used as a purification material.

Aragonite and calcite that have taken up arsenic are stable under alkaline conditions (pH: >8.5) so that arsenic is not eluted.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. An arsenic sorbent comprising monohydrocalcite that has been precipitated by mixing a soluble carbonate or an aqueous solution of a carbonate with an aqueous solution that includes an $Mg^{2+}$ ion and a $Ca^{2+}$ ion in a ratio "Mg/Ca" of 0.3 or more, the monohydrocalcite having a molar ratio "Mg/(Ca+Mg)" of 0.1 or less.

2. The arsenic sorbent according to claim 1, the monohydrocalcite having a molar ratio "Mg/(Ca+Mg)" of 0.01 or less.

3. The arsenic sorbent according to claim 1, the monohydrocalcite being a powder having an average primary particle size of 900 nm or less and an average secondary particle size of 30 μm or less.

4. The arsenic sorbent according to claim 2, the monohydrocalcite being a powder having an average primary particle size of 900 nm or less and an average secondary particle size of 30 μm or less.

* * * * *